Oct. 26, 1971   R. E. HOLT ET AL   3,614,834
EXTENSOMETER FOR LARGE DIAMETER RODS
Filed Sept. 9, 1969   2 Sheets-Sheet 1
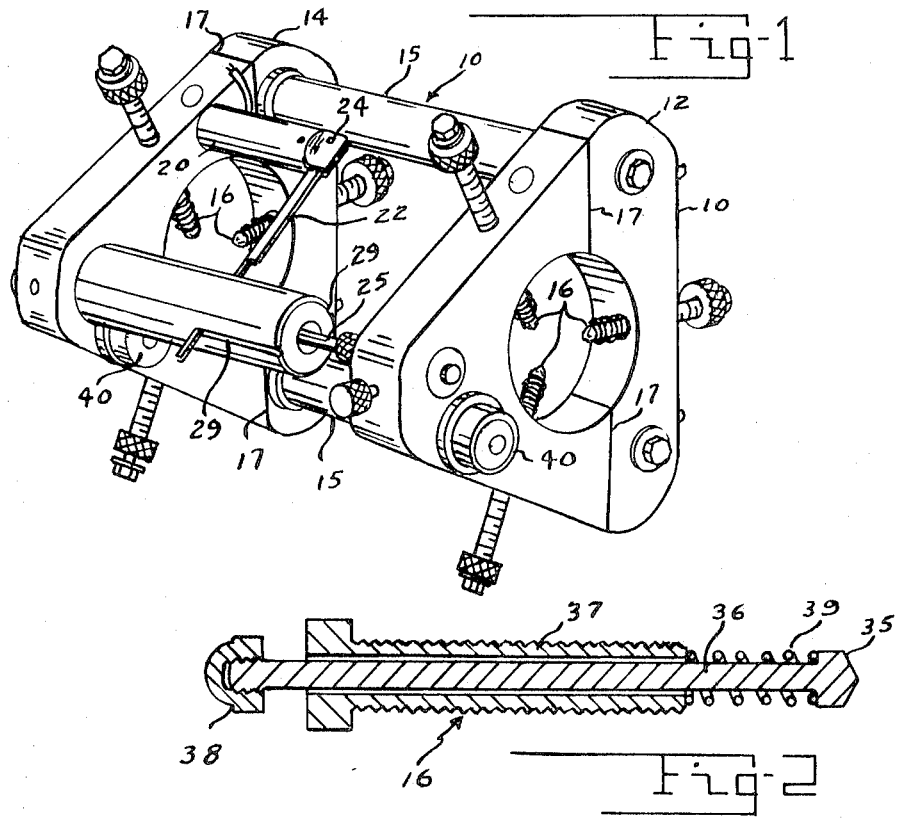
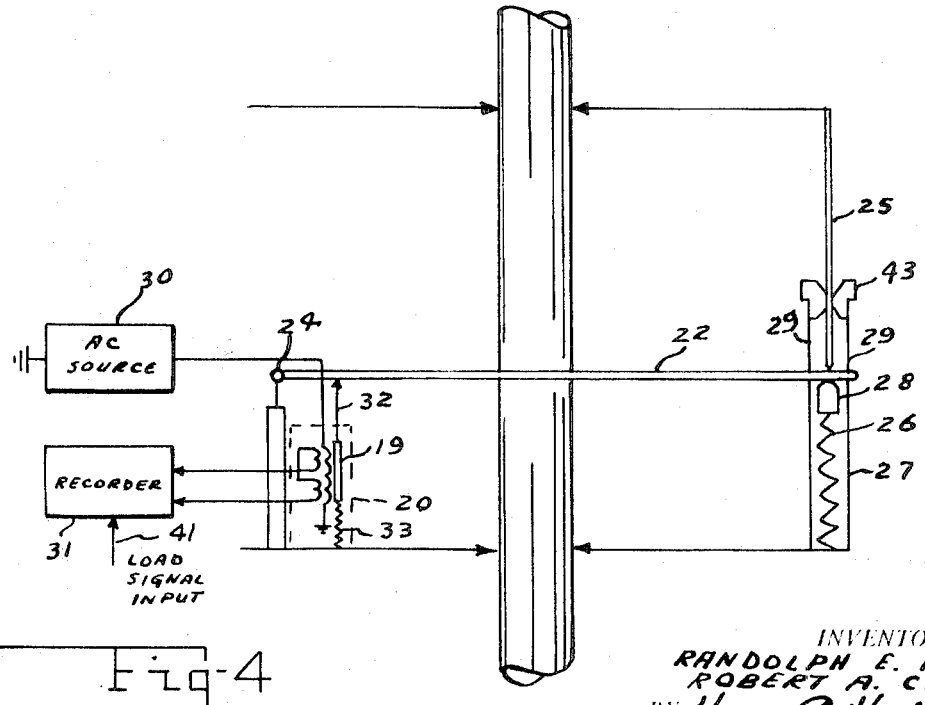
INVENTORS
RANDOLPH E. HOLT
ROBERT A. CRIST
BY Harry A. Herbert Jr.
ATTORNEY
Richard J. Killoe
AGENT

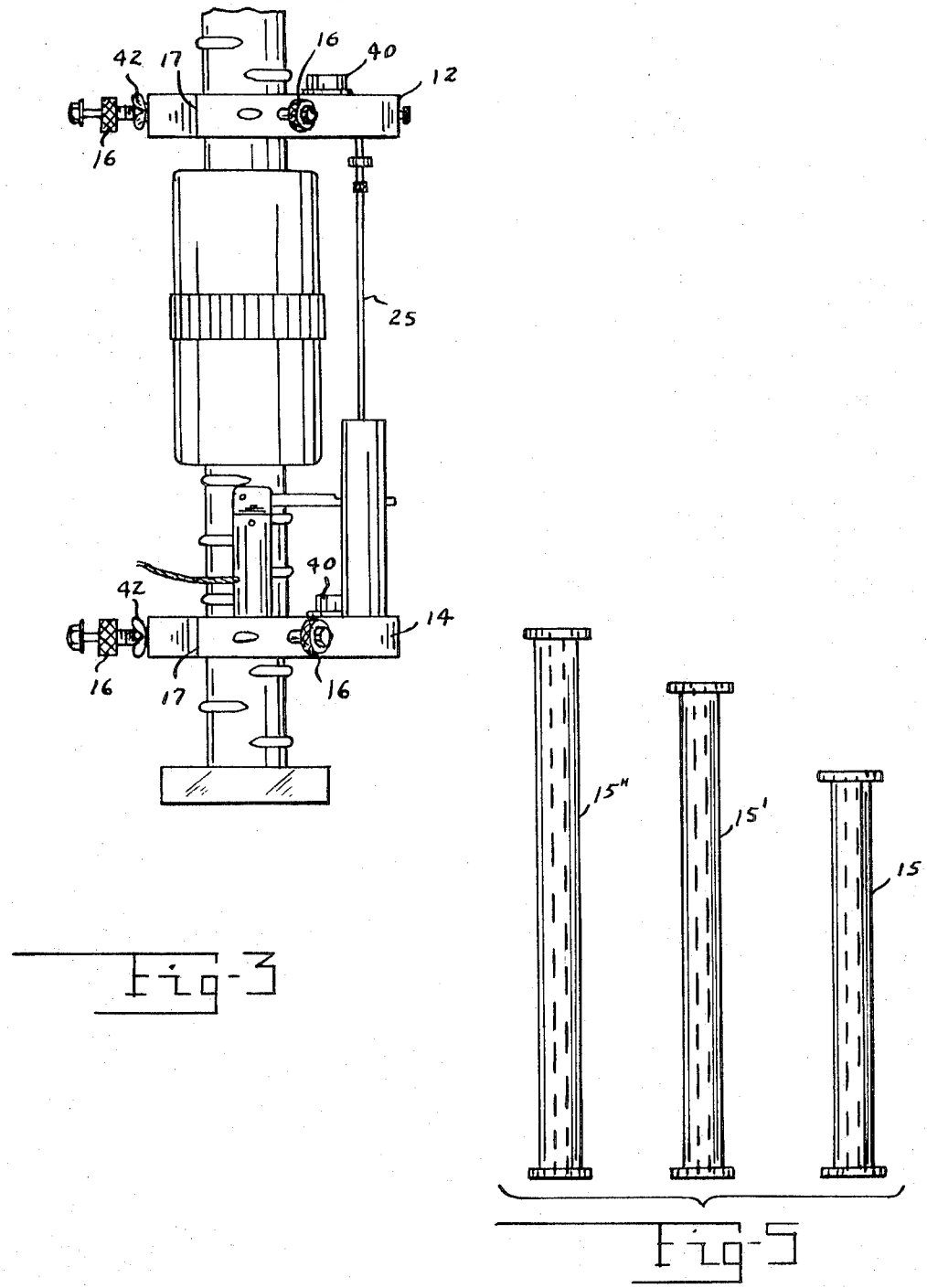

3,614,834
EXTENSOMETER FOR LARGE DIAMETER RODS
Randolph E. Holt and Robert A. Crist, Albuquerque,
  N. Mex., assignors to the United States of America as
  represented by the Secretary of the Air Force
Filed Sept. 9, 1969, Ser. No. 856,416
Int. Cl. G01b 7/02, 7/14, 7/16
U.S. Cl. 33—147 D                                        4 Claims

ABSTRACT OF THE DISCLOSURE

An extensometer having a pair of head members with circular openings therein for receiving reinforcing bar test specimens, each having three spring-loaded gage points for mounting the head members on the test specimen. A linear variable differential transformer is mounted in a housing on one of the head members and provides an output signal. The differential transformer is operated by a displacement shaft connected to the other head member through a 10:1 ratio arm.

BACKGROUND OF THE INVENTION

There is a problem in trying to obtain complete stress-strain data on large diameter spliced steel reinforcing bars. No extensometer is presently available which is capable of providing test data for sleeve type spliced reinforcing bars.

SUMMARY OF THE INVENTION

According to this invention an extensometer is provided which has upper and lower head members which are mounted on either side of the splice sleeve by means of spring-loaded gage points. Space bars are secured to the head members when they are being mounted and are removed after mounting. A linear variable differential transformer mounted on one head member is operatively connected to a displacement shaft attached to the other head member by a 10 to 1 ratio arm. The output of the differential transformer is supplied to a recorder.

BRIEF DESCRIPTION OF THE DRAWING

FIG. 1 is a perspective view of an extensometer according to the invention;
FIG. 2 is an enlarged sectional view of one of the spring-loaded gage points for the device of FIG. 1;
FIG. 3 shows the extensometer of FIG. 1 on a spliced reinforcing bar test specimen;
FIG. 4 is a schematic diagram showing the extensometer measuring system of the invention; and
FIG. 5 shows additional spacing shafts for use with the device of FIG. 1.

DETAILED DESCRIPTION OF THE INVENTION

Reference is now made to FIG. 1 of the drawing wherein reference number 10 shows an extensometer having an upper head member 12 and a lower head member 14 secured to shaft members 15. Each head member has three spring-loaded gage points 16, shown in greater detail in FIG. 2, spaced 120° apart. The head members 12 and 14 may be separated along separation lines 17 so that the extensometer may be installed on a test specimen without removing one end of the specimen from the chuck. Separation is not necessary when the extensometer can be slipped over one end of the test specimen.

A linear variable differential transformer 19, shown schematically in FIG. 4, is located within a housing 20 which is secured to the lower head member 14.

A magnifictaion lever 22 with a ratio of about 10:1 is pivoted at 24 on housing 20 and is operated by a displacement shaft 25 which is connected to head member 12 and bears against one side of arm 22. A spring 26 in displacement shaft housing 27 has a nylon tip 28 which bears against the other side of arm 22. Arm 22 moves in slots 29 in housing 27. The differential transformer 19 is energized in the usual manner by an A.C. source 30 with the output of the differential transformer being supplied to a recorder 31. The operating arm 32 of differential transformer 19 bears against the bottom of arm 22 under the influence of spring 33. Each of the gage points 16 shown in FIG. 2 has a hardened steel tip 35 on a shaft 36. The shaft 36 passes through a collar member 37 and has a cap nut 38 threaded onto the other end thereof. A spring 39 surrounds the shaft member 36 and operates between the tip 35 and collar member 37. The collar member 37 is threadably secured to the head member 12 or 14. A bull's-eye level 40 is located on each of the head members 12 and 14.

In the operation of the device, the upper and lower head members are secured to spacer members 15, shown in FIG. 5, of the desired length. A shaft 25 of the proper length is then installed. The extensometer is then placed on the specimen by passing the openings in the head member over the end of the specimen or by releasing wing nuts 42 and separating the head members along the separation lines 17. After the extensometer is placed on the specimen the gage points are inserted in the head members and collar members 37 are turned down so that the points 35 engage the specimen and the springs 39 are compressed slightly. After the heads are properly leveled, the points are peened into the specimen and the members 37 are again advanced to further compress springs 39. The spacers 15 are then removed and the levels are again checked. The apparatus is then ready to start the tensile test on the specimen during which the elongation is registered on the recorder in response to the output of the differential transformer. The tensile load signal will be applied to recorder input 41 in the conventional manner. The spring-loaded gage points will maintain engagement with the specimen in the event of necking in the region of the gage points.

Since the displacement shaft 25 just slides in Teflon bushing 43 in housing 27 and is not secured to arm 22, the only damage to the extensometer if it is left on the specimen to failure of the specimen is shearing of the gage point tips, which are easily replaced.

While the extensometer of the invention has been described as for use with reinforcing bars with sleeve type splices it may also be used in other type testing such as with reinforcing bars without splices or with rectangular specimens in which case the heads would be modified to provide four spring-loaded gage points spaced 90° apart on each of the head members.

We claim:
1. An extensometer for testing large diameter reinforcing bars, comprising: a first and a second head member each having a central opening and at least three spring-loaded gage points secured to each of the head members and extending into the central openings thereof; a first housing member secured to one of said head members; a second housing member secured to said one head member; said second housing member being spaced from said first housing member and having an elongated slot therein; a lever arm pivotably connected to said first housing member and extending into the slot in said second housing member; an operating shaft secured to the other of said head members and extending into said second housing member into engagement with said lever arm; a spring within said second housing member having means thereon engaging the side of the lever arm opposite the operating shaft; a linear variable differential transformer within said first housing member having its armature operatively engaging to said lever arm at a point closer to the pivotable connection on said first housing member than the distance to the point of engagement of said operating shaft whereby the movement of the transformer armature is less than the movement of said operating shaft; and means for obtaining an output signal from said differential transformer.

2. The device as recited in claim 1 including means for leveling said first and said second head members on a test specimen.

3. The device as recited in claim 1 wherein said head members include means for parting the head members along separation lines passing through said openings whereby the extensometer may be mounted on a test rod without passing it over the end of the rod.

4. The device as recited in claim 3 including means for leveling said first and said second head members on a test specimen.

References Cited

UNITED STATES PATENTS 3,151,399  10/1954  MacGeorge _____ 33—147 D

FOREIGN PATENTS 728,625  1955  England _____ 33—147 D

LEONARD FORMAN, Primary Examiner

P. G. FOLDES, Assistant Examiner

U.S. Cl. X.R.

33—148 D